United States Patent [19]
Kleinberg

[11] 3,742,594
[45] July 3, 1973

[54] ANTIMONY ELECTRODES AND METHOD OF MANUFACTURING SAME

[75] Inventor: Israel Kleinberg, Winnipeg, Manitoba, Canada

[73] Assignee: Harco Electronics Ltd., Winnipeg, Manitoba, Canada

[22] Filed: May 10, 1971

[21] Appl. No.: 141,916

[52] U.S. Cl.................... 29/592, 113/119, 174/84
[51] Int. Cl............................................. H01s 4/00
[58] Field of Search................. 29/460, 527.4, 628, 29/592; 113/119; 174/84 R, 90; 204/195

[56] References Cited
UNITED STATES PATENTS
3,144,507  8/1964  Scadron.............................. 174/84
3,451,609  6/1969  Gillett................................. 174/84
3,525,799  8/1970  Ellis................................ 29/628 X Primary Examiner—Charles W. Lanham
Assistant Examiner—James R. Duzan
Attorney—Kent & Ade

[57] ABSTRACT

Short fine rods of antimony are soldered to one end of a fine silver wire which is then coated with a plastic sheath for insulation and stiffening purposes. The antimony and silver wire electrode is supported vertically with the antimony uppermost and the liquid resin is applied at the sides of the distal end of the antimony and flows down covering the antimony and silver wire but leaving the tip face of the antimony exposed. This process eliminates micro crevices between the resin and the antimony tip.

4 Claims, 4 Drawing Figures

PATENTED JUL 3 1973 3,742,594

ANTIMONY ELECTRODES AND METHOD OF MANUFACTURING SAME

This invention relates to new and useful improvements in antimony electrodes and the method of manufacturing same particularly for use with pH meters in the measurement of pH in the health, research and industrial fields.

Conventional electrodes used in this type of work have been glass electrodes which consist of a membrane enclosing a Ag:AgCl electrode immersed in dilute hydrochloric acid and which functions essentially as a semi-permeable cation exchange membrane. However, because of its fragility, the glass electrode does not lend itself to miniaturization so that suitable micro-electrodes are not available commercially for pH measurement which electrodes are, in size, between approximately 0.05 and 1.0 mm in diameter.

Attempts have been made in the past to form such electrodes from antimony but conventional methods of manufacture suffer from many disadvantages.

However, such electrodes have been used experimentally to measure the pH of the bacterial films that collect on the surfaces of the teeth and in the soft tissue space that surrounds the neck of the tooth.

The properties of the antimony micro-electrode that make this possible are as follows. First, the antimony electrode can be made much smaller and more robust than pH electrodes made from glass. Secondly, the design can be easily varied and as a result antimony micro-electrodes can be constructed, which can reach many areas in biological and non-biological systems inaccessible to micro glass electrodes even should these be of comparable size.

An electrode constructed from antimony is more stable than the glass electrode when the pH of biological tissues is being measured because the glass electrode is subject to electrostatic effects as a result of the high resistance of the glass. This necessitates the use of well-shielded wire lead to reduce these effects but this leads to increased size and decreased flexibility.

Since the antimony electrode has a very low resistance, this problem does not exist and as a consequence only a fine single flexible wire is required for a lead. Besides reducing the bulk, it enables greater ease of utilization, particularly when monitoring is required.

Experiments have established that antimony micro-electrodes behave in exactly the same way as antimony electrodes of larger size. When used in conjunction with a calomel electrode and a potassium chloride salt bridge, often a negligible junction potential exists when the two are located in different regions of the human body during pH measurement. However, to enable its use with a potassium chloride salt bridge at the site of pH measurement without losing the advantages achieved by miniaturization of the micro-antimony electrodes, I have developed a simple and versatile micro-salt bridge.

The bridge consists of approximately 3 feet or more of teflon AW25 gauge tubing, although other material can be used. Teflon was chosen because it is chemically inert. The tubing is filled with a heated and saturated solution of potassium chloride (KCl), using a syringe and fine needle to fill same and making sure that all the air in the tubing has been removed. Subsequently cooling to room temperature leads to the formation of some KCl crystals and thus ensures that the solution will remain saturated if, during use, some temperature change occurs. Both ends are plugged with two saturated cotton wicks or plugs which have been first soaked and treated in saturated potassium chloride (KCl) solution; these wicks or plugs are then given a resin sheath using Hysol epoxy. The resin sheath acts as a stiffener, as a result of this outer sheath, and then fits firmly and snugly into the Teflon tubing. However, the inner lumen of the plug or wick remains porous enough to allow the KCl to saturate the complete wick or plug and remain conductive without the bridge having any leakage rate; very fine glass rod can also be used in place of the Teflon tubing. The salt bridges are coiled and stored in a concentrated solution of KCl when not in use, thus prolonging their life expectancy. This bridge can also be used with all forms of ion selective electrodes where the calomel electrode (or electrode utilizing the same principle) is used as the reference. There is no potential due to flow when a flowing fluid is monitored.

Where the glass pH electrode is a component of other electrodes, replacement by a much smaller, robust antimony micro-electrode permits miniaturization. The most important situation at the present time is the $pCO_2$ electrode which essentially consists of a glass pH electrode surrounded by bicarbonate buffer and covered by a membrane permeable to gases but not to ions or water. Most $pCO_2$ electrodes consist of a slightly convex glass electrode used in conjunction with a reference electrode in an electrolyte jacket on which the $CO_2$ permeable membrane is mounted.

The electrode usually consists of 0.01 molar sodium bicarbonate solution which provides the most stable and sensitive electrolyte, but for faster response for use at low $pCO_2$, the concentration may be reduced to 0.001 molar.

The basic research into $pCO_2$ electrodes has been carried out previously and the proposal at the present time is to attempt its miniaturization by replacing the glass electrode with the antimony electrode.

This and the use of a miniaturized salt bridge would lead to the preparation of a combined pH, $pCO_2$ and $pO_2$ electrode which would be of considerable importance in the medical field for simultaneous monitoring of pH and the oxygen and $CO_2$ tension of blood in the operating room.

Furthermore, enzymes are being used in conjunction with oxygen electrodes to develop some enzyme electrodes and it would be a natural development to use the antimony micro-electrode to construction electrodes for those enzymes which lead to a change in pH or to change in $pCO_2$.

One method of preparing micro-electrodes of antimony which has been used in the past, is to melt chemically pure (99.99 percent) antimony granules in a container which is preferably shielded from the effects of oxygen by providing a constant stream of nitrogen over the surface of the melted antimony.

A soft glass tube is drawn out at one end, to a fine capillary, with a bore size ranging from 0.1 to 0.5 mm in diameter depending upon the size of the electrode desired. A length of rubber tubing is attached to the opposite end of this soft glass tubing, and while the free end of the rubber tubing is held in the mouth, the capillary is inserted into the open end of the container containing the molten antimony. The antimony is then quickly drawn up into the capillary which is then with-drawn so that a rod of antimony at least 5 to 10 mm in length will be trapped in the capillary tubing.

This capillary tubing may then be ground or chipped away to leave the rod of antimony or, alternatively, the rod of antimony may be ejected from the capillary by the insertion of a fine wire into one end thereof.

A small piece of antimony is sectioned from these rods — approximately 1 mm to 3 mm. in length. A fine silver wire to act as a lead is then fused or secured to one end of this antimony rod by means of soft solder and the rod is then ready for further treatment. It is essential that the antimony and wire are exactly in line since attachment to the side will lead to thickening of the electrode. Electroplating and vacuum depositing on wires have been carried out but these do not permit satisfactory insulation which is one of the essential points of the present invention. The insulating material must in addition act as a reinforcing sheath for the antimony rod. Antimony rod is extremely brittle and easily broken but by reducing its length and with appropriate insulation this disadvantage is virtually eliminated.

The silver wire lead can be made as long as desired because the antimony rod is essentially a continuation of the silver wire. Before or after insulating it can be used in a variety of different ways. For example, it can be built into long needles, it can be bent even after insulation to facilitate taking pH measurements in situations inaccessible to present methods.

Attempts have been made to coat these rods completely in acrylic resin and then to grind off the end of the resin to expose the tip of the rod. Another method is to leave the antimony rod in the glass capillary.

Both methods suffer from the principal disadvantage that it is almost impossible to ensure a complete bond between the antimony rod and the surrounding sheath material and it is for this reason that other attempts to prepare micro-electrodes of antimony have ended in a complete lack of consistency in the operation thereof and although this may not be important when used for experimental work, nevertheless it becomes critical if micro-electrodes are to be produced commercially.

The lack of bond between the rod and the sheath material forms micro-crevices in which solution from the mouth, for example, remains, thus spoiling the reading when the electrode is moved to another position. Even when the end is ground off as hereinbefore described, there is a tearing action of the exposed tip of the antimony rod which tends to pull it away from the sheath in the direction of movement of the grinding element and here again a crevice is formed. Also of importance is the fact that when the antimony is drawn up into the capillary to form the rod, a meniscus is formed and here again micro-crevices exist at the tip of the antimony rod between this tip and the sheath material.

SUMMARY OF THE INVENTION

The principal object and essence of the present invention is therefore to provide a micro-electrode of antimony which eliminates the lack of bonding between the electrode and the sheath material particularly at the tip thereof.

Another object of the invention is to provide a device of the character herewithin described in which the micro-electrodes can be manufactured consistently and with the minimum chance of failure occurring.

A yet further object of the invention is to provide a device of the character herewithin described in which the micro-electrodes are extremely robust and in which they can, if desired, be further reinforced thus eliminating dangers of accidental breakage during manufacture, transportation, storage and use.

A further object of the invention is to provide a device of the character herewithin described which can be easily altered in shape to take pH measurements in situations not presently possible with existing methods.

A further object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced or included in the method, process, construction, composition, arrangement or combination of parts, or new use of any of the foregoing, of which concept, one or more specific embodiments of same are herein exemplified as illustrative only of such concept, reference being had to the accompanying figures in which:

In the drawings like characters of reference indicate corresponding parts in the different figures.

DETAILED DESCRIPTION

Figure 1:
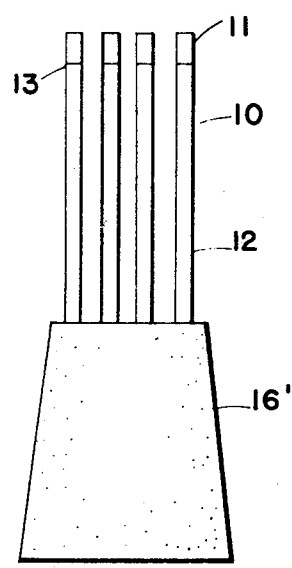
FIG. 1 shows a front elevation of a plurality of micro-electrodes ready for the application of the sheath material.
Figure 2:
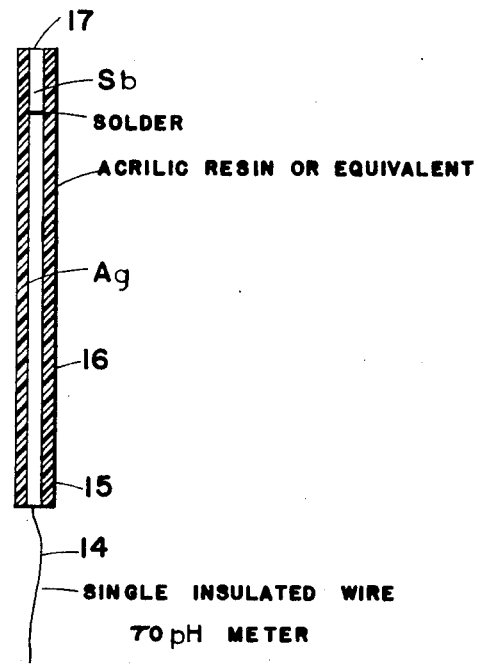
FIG. 2 is an enlarged partially sectioned view of one of the micro-elements.

Proceeding therefore to describe the invention in detail, the antimony micro-electrodes 10 are manufactured as hereinbefore described and by processes which do not form part of this invention.

Each micro-electrode is then soldered by one end 11 thereof to a length of fine silver wire 12 by means of soft solder 13 and eventually, an insulated single flexible wire cable 14 will be secured to the distal end 15 of the silver wire 12.

However, before this insulated single flexible wire is attached, a sheath 16 is applied. The combined electrodes and wires are placed in an upright position as shown in FIG. 1 with the antimony electrodes 11 uppermost and in this particular embodiment, a cork 16' receives the silver wires 12 in one end thereof thus holding the combination wires and electrodes in the vertical position as shown.

The sheath 16 is made fron an acrylic casting resin and an example of this resin is known by the trade mark "Araldite" which is a casting resin D plus hardener 951.

However, any self-curing acrylic resin can be used providing it will set up to the required degree of hardness and in this connection I prefer to use heat to ensure the correct cure.

The acrylic resin is mixed and is a syrupy consistency at this point. It is applied by means of a spatula to each side of the antimony electrode at the upper end 17 thereof ensuring that this upper end 17 is not covered.

The resin flows downwardly over the electrode and covers the soldered junction between the electrode and the silver wire and sufficient is placed thereon to give the required thickness of coating to the electrode. These electrodes are then put in an oven at a temperature of approximately 200° C for 2 or 3 minutes which causes the resin to flow and to bond to the antimony electrode and to cure to glass-like consistency which can be scratched with a scalpel.

This sheath strengthens the electrode to the extent that it can be dropped without breaking and, of course, increases the life of the electrode during use.

Another resin that has been successful is a 5-minute fast cure room temperature resin sold under the trade mark "HYSOL" No. 0608 KIT.

The important feature of the process or method just described is the fact that the electrodes must be in the vertical position when the resin is applied so that it flows away from the electrode tip 17 and forms a complete bond between the electrode and the resin thus eliminating any crevices at the tip area. This eliminates any necessity for grinding the tip as the electrode is ready for use.

Although the micro-electrodes hereinbefore described primarily for intra-oral use, nevertheless it will be appreciated that they can be used with anything which involves a pH change. It will further be appreciated that the cross section of these antimony electrodes can be varied for example by forming same between glass rather than by capillary means.

The method utilized for applying the sheath must include the upright position of the electrodes which enables the sheath to be applied right to the tip but leaving the tip exposed. By heating the sheathed electrode, the acrylic resin set up to the controlled degree of hardness and also complete bonding to the micro-electrode is ensured.

Figure 3:
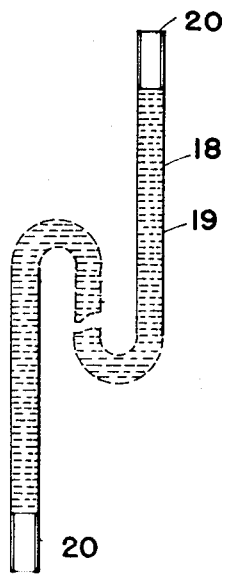
FIG. 3 is a side elevation of one embodiment of the salt bridge enlarged for clarity.
Figure 4:
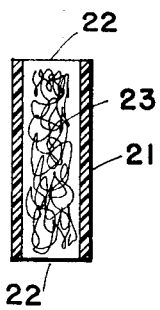
FIG. 4 is an enlarged cross sectional view of one of the plugs in the end of the salt bridge tube.

FIG. 3 shows one embodiment of the salt bridge utilized with this invention. Reference character 18 indicates a length of relatively narrow diameter tubing made of an inert material such as Teflon, if it is desired that it be flexible or, glass if not. The tubing is filled with a heated and saturated solution of potassium chloride 19 (KCl) using a syringe and fine needle to fill same and making sure that all air in the tubing has been removed.

These wicks or plugs are then given a resin sheath around the walls thereof, said sheath being indicated by reference character 21, it being understood that the ends 22 of the plugs are not coated. I use a resin known by the trade name "HYSOL" epoxy, although other resins can be used. The resin sheath 21 acts as a stiffener and as a result of this outer-sheath, the plug fits firmly and snugly into the tubing 18. However, the inner lumen 23 of the plug or wick remains porous enough to allow the potassium chloride to saturate the complete wick or plug and remain conductive without the bridge having any appreciable leakage rate. As mentioned previously, very fine glass rod can be also used in place of the plug, but these are very difficult to position properly for stable reading. However, the flexible tubing made from a plastic such as Teflon is desirable as they can be coileand stored in a concentrated solution of potassium chloride when not in use, thus prolonging the life expectancy of the salt bridge.

Various modifications can be made within the scope of the inventive concept, which is herein disclosed and/or claimed. Accordingly, it is intended that what is set forth should be regarded as illustrative of such concept and not for the purpose of limiting protection of any particular embodiment thereof, and that only such limitations should be placed upon the scope of protection to which the inventor hereof is entitled as justice dictates.

What I claim as my invention is:

1. The method of forming antimony electrode assemblies consisting of the steps of soldering a relatively short length of cast antimony rod to one end of a length of fine silver wire, supporting said assembly substantially vertically with the antimony rod uppermost and then coating the rod and at least a portion of the wire with a suitable plastic resin and then soldering a flexible insulated conductor to the other end of said silver wire.

2. The method according to claim 1 in which said rod and said wire are of similar diameters and are in end to end relationship one with the other.

3. The method according to claim 1 in which said assembly is supported by inserting the upper end of said silver wire into a supporting surface.

4. The method according to claim 2 in which said assembly is supported by inserting the upper end of said silver wire into a supporting surface.

* * * * *